(12) United States Patent
Cheng (10) Patent No.: US 7,806,777 B2
(45) Date of Patent: Oct. 5, 2010

(54) AUTOMATICALLY ADAPTING VIRTUAL EQUIPMENT MODEL

(75) Inventor: Yuchiang Cheng, San Francisco, CA (US)

(73) Assignee: World Golf Tour, Inc., San Francisco, CA (US)

( * ) Notice: Subject to any disclaimer, the term of this patent is extended or adjusted under 35 U.S.C. 154(b) by 97 days.

(21) Appl. No.: 11/407,163

(22) Filed: Apr. 18, 2006

(65) Prior Publication Data

US 2007/0243926 A1    Oct. 18, 2007

(51) Int. Cl.
*A63B 69/36* (2006.01)
(52) U.S. Cl. ............... 473/131; 473/409; 463/2; 463/3
(58) Field of Classification Search ........... 463/23, 463/2, 3, 25, 31–32, 42; 473/131, 223, 409; 705/59, 80; 700/91; 340/323 R
See application file for complete search history.

(56) References Cited

U.S. PATENT DOCUMENTS

| | | | | |
|---|---|---|---|---|
| 4,367,874 | A * | 1/1983 | Staub et al. | 473/537 |
| 4,822,042 | A * | 4/1989 | Landsman | 473/463 |
| 6,468,155 | B1 * | 10/2002 | Zucker et al. | 463/23 |
| 7,121,962 | B2 * | 10/2006 | Reeves | 473/407 |
| 2002/0137566 | A1 | 9/2002 | Tomizawa et al. | |
| 2002/0151337 | A1 * | 10/2002 | Yamashita et al. | 463/8 |
| 2003/0045374 | A1 * | 3/2003 | Viera | 473/346 |
| 2004/0002369 | A1 | 1/2004 | Walker et al. | |
| 2004/0092328 | A1 * | 5/2004 | Patsky | 473/292 |
| 2005/0255931 | A1 * | 11/2005 | Baldwin, Jr. | 473/257 |
| 2006/0247060 | A1 * | 11/2006 | Hanson et al. | 463/42 |
| 2007/0066415 | A1 * | 3/2007 | Hou et al. | 473/219 |

FOREIGN PATENT DOCUMENTS

GB    2118809    11/1983

OTHER PUBLICATIONS

Halo 2, Wikipedia (release date Nov. 9, 2004).*
Notification Of Transmittal Of The International Search Report And The Written Opinion Of The International Searching Authority, Or The Declaration (1 page): International Search Report (5 pages): and Written Opinion Of The International Searching Authority (5 pages): all mailed on Dec. 11, 2007 in PCT International Application No. PCT/US2007/066657 (Total 11 pages).
International Search Report for PCT Application No. PCT/US2007/066657.

* cited by examiner

*Primary Examiner*—Peter DungBa Vo
*Assistant Examiner*—Masud Ahmed
(74) *Attorney, Agent, or Firm*—Innovation Counsel LLP (57) ABSTRACT

Methods and apparatus, including computer program products, for determining a user skill level for user interaction with virtual equipment in an interactive computer game. The virtual equipment is capable of being manipulated through user interaction with an associated representation. Automatically adapting a virtual equipment model associated with the virtual equipment to reflect the determined user skill level. The virtual equipment model governs how the virtual equipment behaves in response to user interaction with the representation.

26 Claims, 5 Drawing Sheets

AUTOMATICALLY ADAPTING VIRTUAL EQUIPMENT MODEL

BACKGROUND

Computer games and other types of simulations typically include a virtual universe that users interact with in order to achieve one or more goals, such as shooting all of the "bad" guys or playing a hole of golf. A virtual universe is the paradigm with which the user interacts when playing a computer game and can include representations of virtual environments, equipment, objects, characters, and associated state information. For instance, a virtual universe can include a virtual golf course, golf clubs and golf balls. Users interact with a virtual universe through a user interface that can accept input from a game controller (e.g., a joy stick, a mouse, verbal commands). A click of a mouse button, for example, might cause a virtual golf club to swing and strike a virtual golf ball in the virtual golf course.

Figure 1:
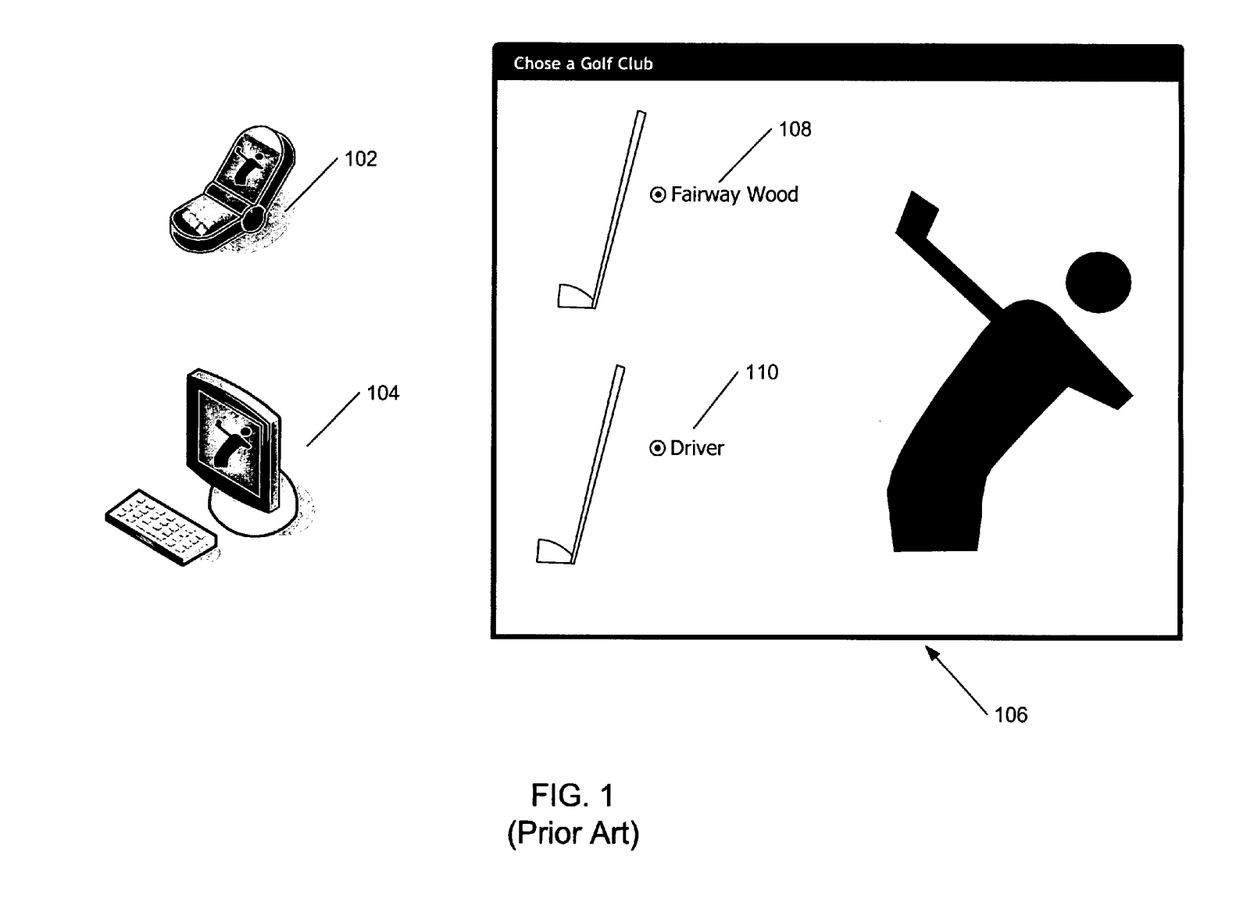
FIG. 1 illustrates a user interface for selecting a golf club.

Typical computer game genres include role-playing, first person shooter, third person shooter, sports, racing, fighting, action, strategy, and simulation. A computer game can incorporate a combination of two or more genres. Examples of popular computer games include, Black & White 2 (available from EA Games), Grand Theft Auto (available from Rockstar Games), Perfect Dark Zero (available from Microsoft Game Studios), and Halo 3 (available from Microsoft Game Studios). Computer games are commonly available for different computer platforms such as workstations, personal computers, game consoles 104 (e.g., Sony PlayStation and PlayStation Portable, Microsoft Xbox, Nintendo GameCube and Game Boy), cellular telephones 102, and other mobile computing devices. See FIG. 1. Computer games can be single player or multi-player. Some multiplayer games allow users connected via the Internet to interact in a common or shared virtual universe.

Users interact with one or more pieces of virtual equipment in a virtual universe, such as a virtual weapon or a virtual golf club. Virtual equipment can also include avatars and other virtual representations of a user including, but not limited to, a user's movements and gestures. By way of illustration, fighting games allow a user to box, kick or punch virtual opponents in a virtual universe. The virtual equipment in these cases is the virtual representation of the user (or the user's movements or gestures) in the fight.

The virtual universe and virtual equipment can change as users achieve goals. For example, in action games as users advance to higher game levels, typically the virtual universe is changed to model the new level and users are furnished with different virtual equipment, such as more powerful weapons. Some computer games allow users to manually select their virtual equipment. For example, a user interface 106 (FIG. 1) for a computer golf game allows users to choose which type of virtual golf club they will use. Users having little skill may chose a fairway wood club 108 rather than a driver 10, which is harder to control in the virtual universe (as in real life). However, computer games do not automatically adapt a given piece of virtual equipment to accommodate how skilled a user has become at using that virtual equipment.

SUMMARY

In general, in one aspect, embodiments of the invention feature determining a user skill level for user interaction with virtual equipment in an interactive computer game. The virtual equipment is capable of being manipulated through user interaction with an associated representation. A virtual equipment model associated with the virtual equipment is automatically adapted to reflect the determined user skill level. The virtual equipment model governs how the virtual equipment behaves in response to user interaction with the representation.

These and other embodiments can optionally include one or more of the following features. The adapting includes changing a sweet spot for the virtual equipment. The sweet spot is an area of a distribution curve for a variable associated with the virtual equipment model. The sweet spot is related to one or more of: accuracy of the user interaction and precision of the user interaction. The adapting includes changing an input model or the associated representation. The adapting is based on a current state of a virtual universe. The determining is in response to detecting an improvement or a decline in the user skill level. The representation includes one or more of: graphical rendering, sound, or haptic feedback. The adapting includes changing or more relationships between a plurality variables in the user interaction model. The virtual equipment is one of: a golf club, a weapon, an automobile, a racket, a ping pong paddle, or a baseball bat.

In general, in another aspect, embodiments of the invention feature determining a user skill level for user interaction with virtual equipment in an interactive computer game. The virtual equipment is capable of being manipulated through user interaction with an associated representation. A sweet spot associated with the virtual equipment is automatically adapted based on the determined user skill level, the sweet spot governing how the virtual equipment behaves in response to user interaction with the representation.

These and other embodiments can optionally include one or more of the following features. The sweet spot is an area of a distribution curve for a variable associated with the virtual equipment. The sweet spot is related to one or more of: accuracy of the user interaction and precision of the user interaction. The adapting includes changing an input model or the associated representation.

Particular embodiments of the invention can be implemented to realize one or more of the following advantages. Virtual equipment automatically adapts to reflect changes in user skill level and keep users challenged as their skill level improves. As a result, users are less likely to loose interest in a computer game. An associated user input model and visual representation of virtual equipment can be automatically modified to reflect changes in users' skill levels. Automatically adapting virtual equipment adds a dimension of realism to electronic games of skill and other types of simulations and provides a more accurate reflection of skill in a virtue world, less hindered by a static, limited user interface.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In various implementations, a given piece of virtual equipment has one or more associated "sweet spots". A sweet spot translates into a margin of error that a user's interaction with a piece of virtual equipment will cause an intended outcome in a virtual universe. In one implementation, a large sweet spot corresponds to a greater deviation on a normalized distribution curve and a small sweet spot corresponds to a lesser deviation on a normalized distribution curve.

For example, there are different types of golf clubs for golfers of differing abilities, each golf club having various sized and located sweet spots. Generally speaking, a golfer can select a club based on the golfer's swing speed and power, and based on the golf club's sweet spot. A club with a large sweet spot tends to be very forgiving since the club's face has been designed with a large surface area in which to make contact with the ball and has a perimeter weigh distribution to balance a miss hit. A golfer's swing of a club with a large sweet spot can be several standard deviations from the mean—the mean being a perfect swing—and still result in an acceptable shot. However, in having a large sweet spot the golfer usually forgoes some level of control, power and feel. For a professional golf club, the sweet spot is much smaller and requires a greater amount of skill to correctly hit the ball but the rewards for hitting a proper shot usually result in farther distance, control, precision, and accuracy. A golfer's swing of a club with a small sweet spot must be closer to the mean in order to be an acceptable shot.

Figure 2:
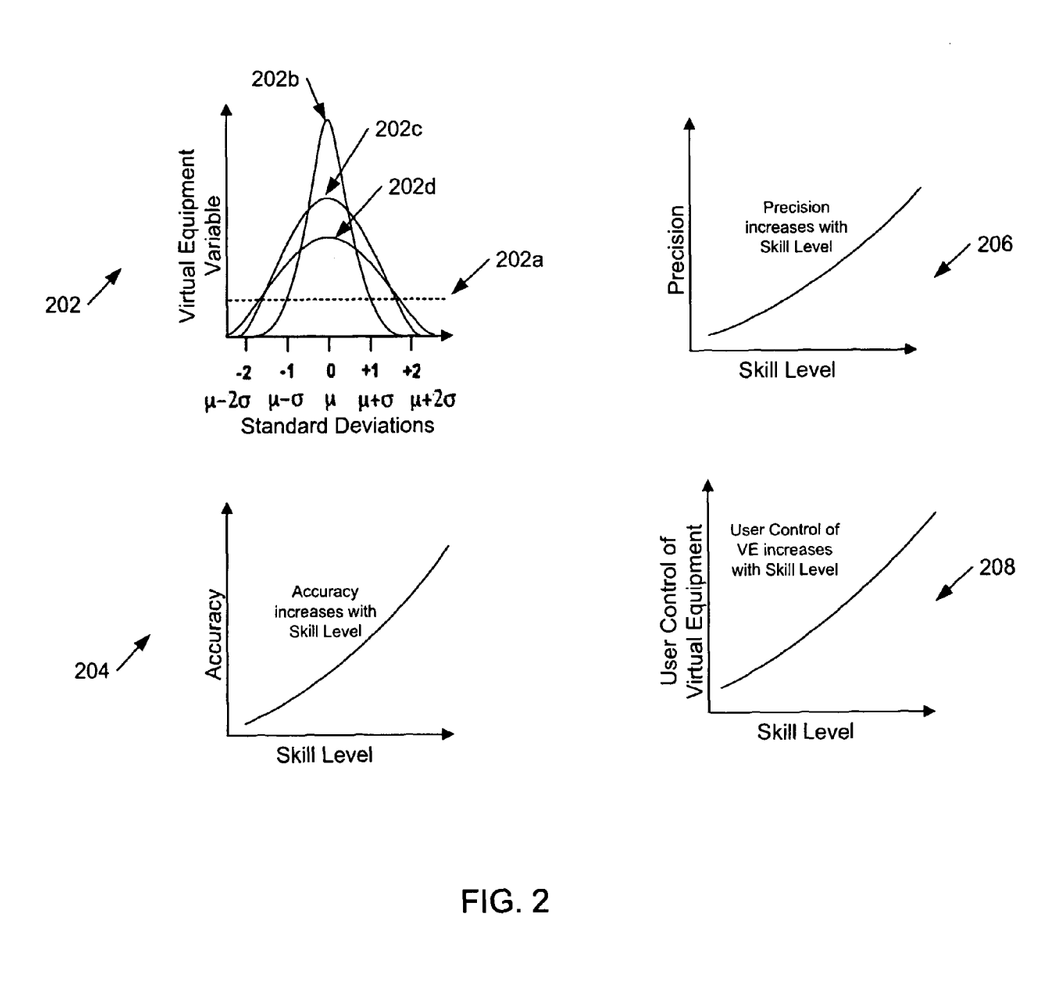
FIG. 2 illustrates four exemplary graphs related to equipment control.

In real life, as users become more skilled with equipment, their existing equipment is easier to use and they can select new equipment that gives them an increased level of control. This observation forms the basis for automatically adjusting a piece of virtual equipment's sweet spot(s) according to a user's skill level. Graph 202 in FIG. 2 illustrates standard deviation curves 202b, 202c, 202d for variables associated with the same or different pieces of virtual equipment. For example, curve 202b could represent the power of a virtual golf club swing, curve 202c could represent the orientation of the virtual golf club face when it impacts a virtual golf ball, and curve 202d could represent the trajectory of a kick or a punch for a virtual fighter. A zero deviation represents the ideal value of a variable (e.g., a small sweet spot) for a piece of virtual equipment, such as the ideal power of a virtual golf club swing or the ideal aim of a virtual gun. Each standard deviation away from zero represents increasingly less than ideal values for a given variable. In one implementation, values above a threshold 202a (which can be different for each curve) have a higher probability of causing a successful outcome (e.g., achieving a goal such as landing a virtual golf ball where the user intended) than values below the threshold. The sweet spot can be viewed as the area of a distribution curve above the threshold and within the requisite standard deviation from the mean. For instance, even with a large sweet spot, it may still be possible to cause a successful outcome if the value for a given variable is above the threshold, although the outcome may not be ideal. Moreover, sweet spots can be varied by the type of virtual equipment. For example, curve 202b could represent a professional forged golf iron club with a very small sweet spot (e.g., +/−1 standard deviation) and curve 202c could represent a hollow back off set beginner iron club with a much larger sweet spot (e.g., +/−1.8 standard deviation).

As a user becomes more adept at using a piece of virtual equipment, the sweet spot for one or more of the virtual equipment's variables is adjusted to require the user's interaction with the virtual equipment to achieve values for those variables closer to their means in order to cause a successful outcome. Likewise, as a user's skill level decreases, the sweet spot for one or more of the virtual equipment's variables can be adjusted to allow for the user's interaction with the virtual equipment to achieve values for those variables farther from their means and still have a chance of causing a successful outcome.

Accuracy is the probability that a given piece of virtual equipment will perform as a user intended. The probability that a swing of a virtual golf club will cause a virtual golf ball to follow an intended trajectory and land where it was aimed is an example of accuracy. By way of another illustration, accuracy can be the probability that a virtual gun will hit a virtual target when fired. Precision is the probability that user interaction with a given piece of virtual equipment will result in the same outcome time after time. For example, precision can be the probability that the same swing of a golf club will result in the same outcome. In one implementation, the accuracy and precision of a given piece of virtual equipment can be automatically increased as a user's skill level increases. Similarly, the accuracy and precision of a given piece of virtual equipment can be automatically decreased as a user's skill level decreases. These relationships are illustrated in exemplary graphs 204 and 206 of FIG. 2. In summary, a user's ability to control virtual equipment increases commensurate with their skill level as shown in graph 208. Although the exemplary graphs 204, 206 and 208 in FIG. 2 illustrate roughly linear relationships, other relationships are possible and can be defined by a virtual equipment model, as described below.

Figure 3:
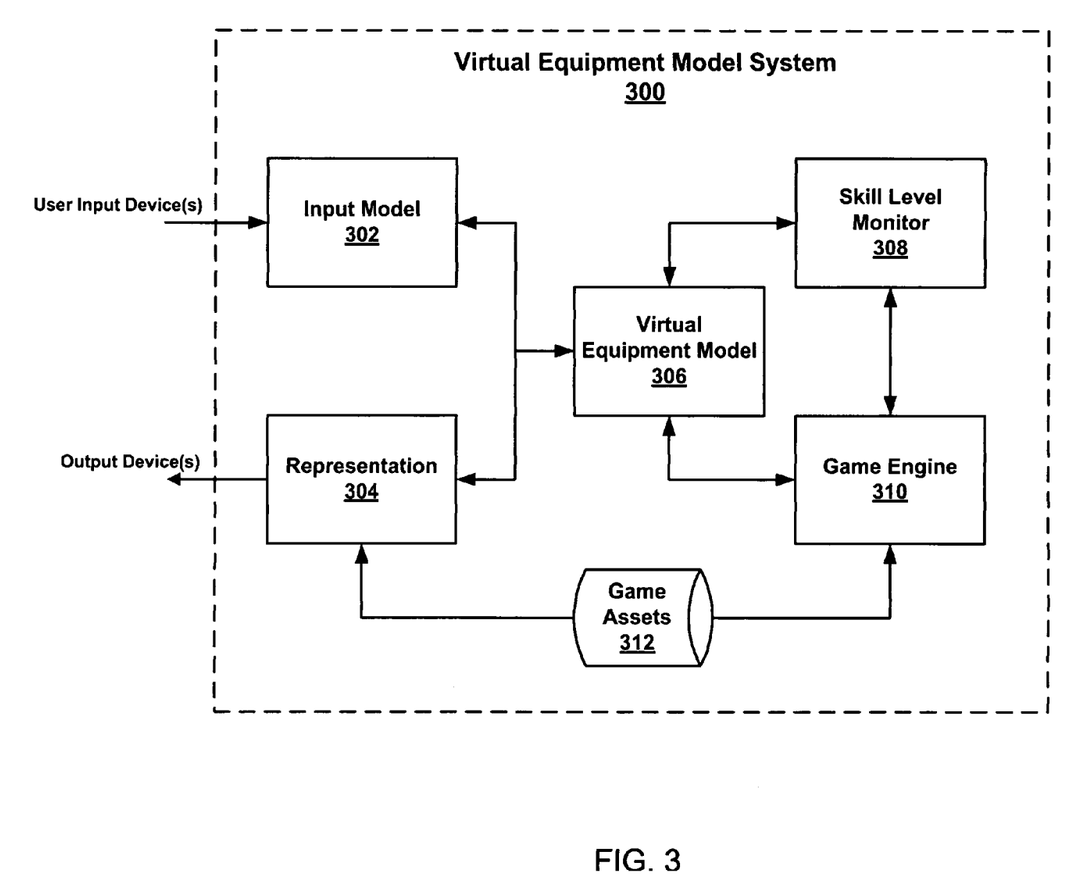
FIG. 3 illustrates a virtual equipment model system.

FIG. 3 is a diagram of a virtual equipment model (VEM) system 300 for a computer game application or other simulation. The functionality encompassed in system 300 can be distributed to fewer or more components than those illustrated. The system 300 includes a VEM 306 which models a piece of virtual equipment. A piece of virtual equipment may comprise more than one object in the virtual universe, such as a set of virtual balls that are juggled by the user in a computer juggling game. In one implementation, there is a VEM 306 for each piece of virtual equipment a user may interact with in a virtual universe. In a further implementation, the VEM 306 maintains a nonempty set of variables and a nonempty set of relationships among two or more of the variables for modeling the behavior of the piece of virtual equipment. In one implementation, a sweet spot for a piece of virtual equipment is inversely related to the precision and accuracy of the virtual equipment.

In one implementation, the VEM 306 minimally includes variables, as described above, representing precision, accuracy, one or more distribution curves (e.g., 202b, 202c), thresholds (e.g., 202a), and sweet spots. If the virtual equipment is a golf club, for instance, variables can include stroke power, club face trajectory, distribution curves and associated sweet spots and thresholds for stroke power and club face trajectory, club accuracy, and club precision.

Generally speaking, a VEM 306 variable's value can be based on a user input, a user's skill level at using the virtual equipment, the attribute of the virtual equipment itself, the state of the virtual universe (e.g., weather, emotional and physical stresses on the player) as determined by a game engine 310, configuration information, the value of one or more other variables, and combinations of these. An input model 302 maps user inputs (e.g., button presses, voice commands, sounds, gestures, eye movements, body movements, brain waves, other types of physiological sensors, and combinations of these) to one or more variable values for variables in the set of variables associated for VEM 306. The VEM 306 interprets user input provided by the input model 302 using the set of relationships. The VEM 306 has an associated representation 304 of the virtual equipment that is presented to a user, such as through a graphical display means (e.g., a liquid crystal or plasma display device), sound generation means, haptic technology, odor generation means, and combinations of these. For example, in a first person shooter game a virtual gun can have a graphical representation consisting of cross hairs indicating where the gun is currently pointed and sound feedback to indicate when the virtual gun is fired. A joystick or other user input device can be used to aim the virtual gun and a button can be pressed to fire the virtual gun. The VEM 306 communicates with a game engine 310 to affect changes to the virtual universe based on user interaction with the VEM 306.

The set of variables, their values, and relationships associated with the VEM 306 can change based the state of a virtual universe, or the context or purpose for which a piece of virtual equipment is used. For example, if the virtual equipment is a sword in a sword fight computer game, successful use of the sword requires a user to perform certain offensive and defensive actions that are appropriate given the actions of the user's opponent. In addition to sweet spot(s) associated with the virtual sword, each virtual sword action may have its own sweet spot(s) associated with it, which can change based on the type of offensive or defensive action the user is attempting. The sword's sweets spot could also vary based on the type of sword being used which would also affect the threshold level.

A skill level monitor 306 monitors changes to user skill level. A change in user skill level can be detected by the user's proficiency at using a given piece of virtual equipment to achieve one or more goals in the virtual universe (e.g., such as an improved score), the ability to perform relatively advanced tasks with the virtual equipment, an achieved accuracy rate using the virtual equipment, an achieved precision rate using the virtual equipment, time spent using the virtual equipment, combinations of these, and other factors. In one implementation, user skill level is quantified as a number. If the skill level increases or decreases beyond a certain threshold, a change is communicated to the VEM 306, which in turn can communicate the change to the input model 302 and the representation 304. Using a non-zero threshold value can prevent the VEM 306 from changing too rapidly.

Based on a change in skill level, one or more of the VEM 306, the input model 302, and the representation 304 can adapt to reflect the change. Adapting the VEM 306 can include changing the value of one or more variables in the set of variables, changing one or more relationships in the set of relationships, adding or removing one or more variables in the set of variables, adding or removing one or more relationships in the set of relationships, and combinations of these. In the case of an increased user skill level, for example, the virtual equipment model 306 could add additional variables for controlling the virtual equipment that were not available at a lower skill level and change variables representing distribution curves, thresholds and sweet spots.

Adapting the input model 302 can include changing the way a user interacts with the representation 304 by adding or removing required and optional user inputs, changing the order of user inputs, changing the semantics of user input, and changing the mappings of user input to one or more variables in the set of VEM 306 variables. By way of illustration, if the virtual equipment is a golf club, the user input at one skill level could include two mouse button clicks: the first click to set the power of a stroke and the second click within a preset time limit from the first click to determine the trajectory of the golf club face as strikes a virtual golf ball. User input at a more advanced skill level could add a third mouse click to determine the loft of the virtual golf ball. Adapting the representation 304 can include changing the virtual equipment appearance, the user interface, sound, haptics, odors, or combinations of these. For example, if the input model 302 or the VEM 306 has been adapted, the representation can be modified to provide an indication of such to the user. A virtual golf club's appearance could be changed to indicate that a user is playing with a more advanced club, for instance.

A game engine 310 maintains state for the virtual universe based on user input and the interaction of objects in the virtual universe. The game engine 310 can include a renderer for rendering graphical views of the virtual universe that can be presented on a display device. The game engine can also artificial intelligence capabilities for determining one or more future states for the virtual universe. Objects in the virtual universe such as virtual equipment are associated with assets 312 (e.g., content, models, sounds, physics, artificial intelligence). Assets are used by the game engine 310 to represent objects and render the computer game. The game engine 310 communicates with the skill level monitor 308 to convey user skill level information, such as detected changes to user skill level. The VEM 306 communicates with the game engine 310 to affect changes to the virtual universe based on user interaction with the VEM 306.

Figure 4:
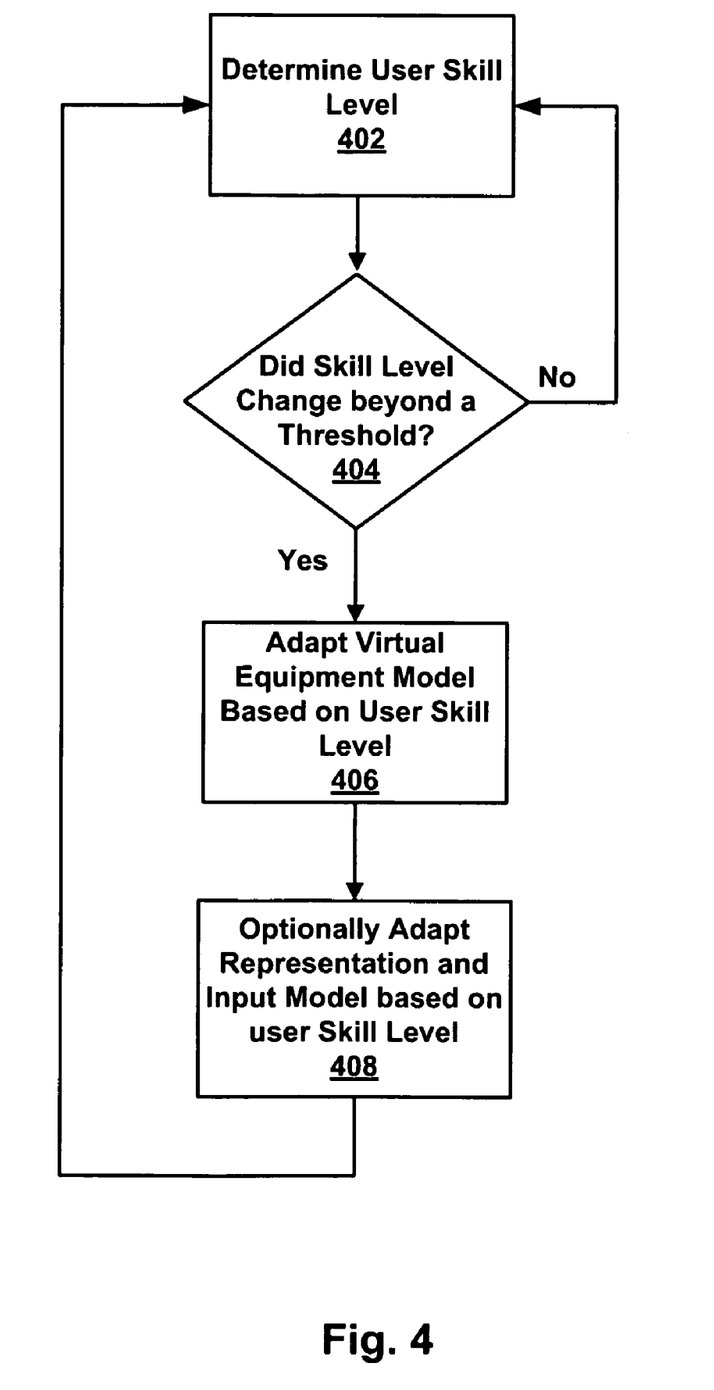
FIG. 4 illustrates a virtual equipment model adaptation process.

FIG. 4 illustrates a virtual equipment model adaptation process. A user skill level for a piece of virtual equipment is determined by, for example, the skill level monitor 308 (step 402). It is then determined whether the skill level has increased or decreased beyond a threshold (step 406). If the user skill level has not increased or decreased beyond the threshold, the user skill level is determined again at a later point in time (step 402). Otherwise, the VEM 306 associated with the virtual equipment is adapted based on the user skill level (step 406), for example by changing the value of one or more sweet spots associated with the virtual equipment, or other variables. The input model 302 and representation 304 can be optionally adapted based on the user skill level (step 408), for example by depicting the head of a golf club differently to emphasize the golf club's changed properties.

Figure 5:
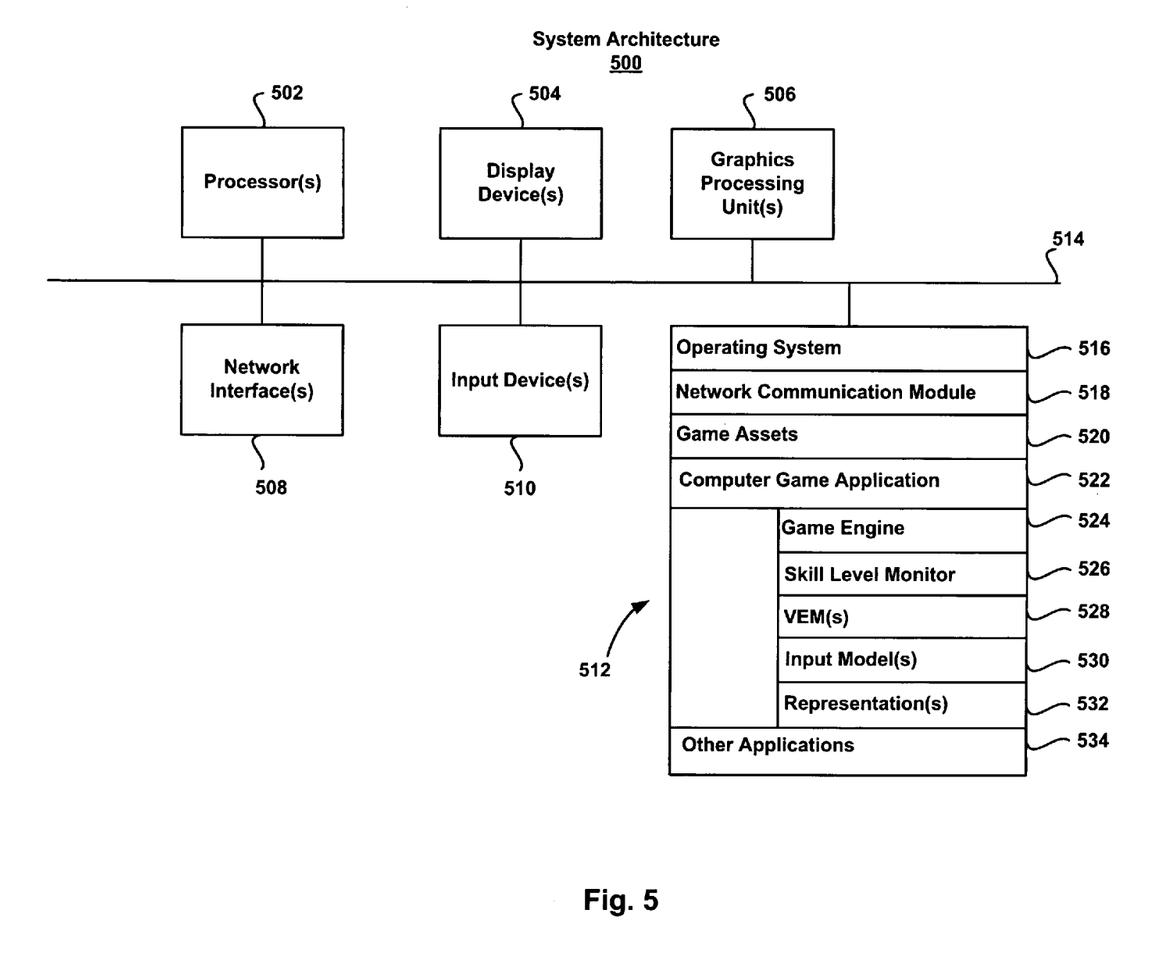
FIG. 5 illustrates a system architecture.

FIG. 5 is a block diagram of exemplary system architecture 500 for automatically adapting virtual equipment model. The architecture 500 includes one or more processors 502 (e.g., IBM PowerPC®, Intel Pentium® 4, etc.), one or more display devices 504 (e.g., CRT, LCD), one or more graphics processing units 506 (e.g., NVIDIA® Quadro FX 4500, GeForce® 7800 GT, etc.), one or more network interfaces 508 (e.g., Ethernet, FireWire, USB, etc.), one or more input devices 510 (e.g., keyboard, mouse, game controller, camera, microphone, etc.), and one or more computer-readable mediums 512 (e.g. SDRAM, optical disks, hard disks, flash memory, L1 or L2 cache, etc.). These components can exchange communications and data via one or more buses 514 (e.g., EISA, PCI, PCI Express, etc.).

The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 512 further includes an operating system 516 (e.g., Mac OS®, Windows®, Linux, etc.), a network communication module 518, computer game assets 520, and a computer game application 522. The computer game application 522 further includes a game engine 524, a skill level monitor 526, one or more VEMs 528, one or more input models 530, and one or more representations 532. In some implementations, the electronic game application 522 can be integrated with other applications 534 or be configured as a plug-in to other applications 534.

The operating system 516 can be multi-user, multiprocessing, multitasking, multithreading, real-time and the like. The operating system 516 performs basic tasks, including but not limited to: recognizing input from input devices 510; sending output to display devices 504; keeping track of files and directories on computer-readable mediums 512 (e.g., memory or a storage device); controlling peripheral devices (e.g., disk drives, printers, GPUs 506, etc.); and managing traffic on the one or more buses 514. The network communications module 518 includes various components for establishing and maintaining network connections (e.g., software for implementing communication protocols, such as TCP/IP, HTTP, Ethernet, etc.). The application 522, together with its components, implements the various tasks and functions, as described with respect to FIGS. 2-4.

The user system architecture 500 can be implemented in any electronic or computing device capable of hosting the application 502, or part of the application 502, including but not limited to: portable or desktop computers, workstations, main frame computers, personal digital assistants, portable game devices, mobile telephones, network servers, etc. All of these component may by physically remote to each other.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, brain waves, other physiological input, eye movements, gestures, body movements, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    receiving user input directed to manipulation of virtual equipment in an interactive computer game, the virtual equipment being manipulated through the user's interaction with an associated representation;
    determining a change in a user's skill level for interaction with the virtual equipment in response to the received user input; and
    adapting a virtual equipment model having one or more variables associated with the virtual equipment to reflect the determined change in user skill level, the virtual equipment model governing how the virtual equipment behaves in response to the user's interaction with the representation, and where the adapting comprises:
        if the change indicates that the user's skill level has increased, decreasing a sweet spot for a variable of the virtual equipment model; and
        if the change indicates that the user's skill level has decreased, increasing the sweet spot for the variable of the virtual equipment model,
        where the sweet spot is an area of a curve for the variable where the area is based on a degree of deviation from an ideal value for the variable.

2. The computer-implemented method of claim 1, where values above a threshold for the variable have a great probability of causing a successful game outcome than values below the threshold.

3. The computer-implemented method of claim 1, where increasing the sweet spot increases accuracy of the virtual equipment and decreasing the sweet spot decreases the accuracy.

4. The computer-implemented method of claim 1, where the adapting includes changing an input model or the associated representation.

5. The computer-implemented method of claim 1, where: the adapting is based on a state of a virtual universe.

6. The computer-implemented method of claim 1, where adapting occurs during game play.

7. The computer-implemented method of claim 1, where: the representation includes one or more of: graphical rendering, sound, or haptic feedback.

8. The computer-implemented method of claim 1, where the adapting further includes: changing one or more relationships between a plurality variables in the user interaction model.

9. The computer-implemented method of claim 1, where: the virtual equipment is one of: a golf club, a weapon, an automobile, a racket, a ping pong paddle, or a baseball bat.

10. The computer-implemented method of claim 1, where determining the change occurs during game play.

11. A computer-implemented method, comprising:
    receiving user input directed to manipulation of virtual equipment in an interactive computer game, the virtual equipment being manipulated through the user's interaction with an associated representation;
    determining a change in the user's skill level for interaction with the virtual equipment in response to the received user input; and
    adapting a sweet spot associated with the virtual equipment based on and in response to the determined user skill level, the sweet spot governing how the virtual equipment behaves in response to user interaction with the representation,
    where the sweet spot is an area of a distribution curve for a variable associated with the virtual equipment.

12. The computer-implemented method of claim 11, where: the sweet spot is related to one or more of: accuracy of the user interaction and precision of the user interaction.

13. The computer-implemented method of claim 11, where: the adapting includes changing an input model or the associated representation.

14. The computer-implemented method of claim 11, where the adapting occurs during game play.

15. The computer-implemented method of claim 11, where determining the change occurs during game play.

16. A non-transitory computer-readable medium having computer-readable instructions thereon, operable to cause data processing apparatus to perform operations comprising:
    receiving input from a user, the input directed to manipulation of virtual equipment in an interactive computer game, the virtual equipment being manipulated through the user's interaction with an associated representation;
    determining a change in the user's skill level for interaction with the virtual equipment in response to the received user input; and
    adapting a virtual equipment model having one or more variables associated with the virtual equipment to reflect the determined change in user skill level, the virtual equipment model governing how the virtual equipment behaves in response to the user's interaction with the representation, and where the adapting comprises:
        if the change indicates that the user's skill level has increased, decreasing a sweet spot for a variable of the virtual equipment model; and
        if the change indicates that the user's skill level has decreased, increasing the sweet spot for the variable of the virtual equipment model,
        where the sweet spot is an area of a curve for the variable where the area is specified by a degree of deviation from an ideal value for the variable.

17. The non-transitory computer-readable medium of claim 16, where values above a threshold for the variable have a greater probability of causing a successful game outcome than values below the threshold.

18. The non-transitory computer-readable medium of claim 16, where increasing the sweet spot increases accuracy of the virtual equipment and decreasing the sweet spot decreases the accuracy.

19. The non-transitory computer-readable medium of claim 16, further operable to cause the data processing apparatus to perform operations comprising: changing an input model or the associated representation.

20. The non-transitory computer-readable medium of claim 16, where: the determining is in response to detecting an improvement or a decline in the user skill level.

21. A non-transitory computer-readable medium having computer-readable instructions thereon, operable to cause data processing apparatus to perform operations comprising:
   receiving user input directed to manipulation of virtual equipment in an interactive computer game, the virtual equipment being manipulated through the user's interaction with an associated representation;
   determining a change in the user's skill level for interaction with the virtual equipment in response to the received user input; and
   adapting a sweet spot associated with the virtual equipment based on and in response to the determined user skill level, the sweet spot governing how the virtual equipment behaves in response to user interaction with the representation,
   where the sweet spot is an area of a distribution curve for a variable associated with the virtual equipment.

22. The non-transitory computer-readable medium of claim 21, where the sweet spot is related to one or more of: accuracy of the user interaction and precision of the user interaction.

23. The non-transitory computer-readable medium of claim 21, where the adapting includes changing an input model or the associated representation.

24. A system comprising:
   a display device;
   machine-readable storage device including a program product; and
   one or more processors operable to execute the program product, interact with the display device, and perform operations comprising:
      receiving user input directed to manipulation of virtual equipment in an interactive computer game, the virtual equipment being manipulated through the user's interaction with an associated representation;
      determining a change in the user's skill level for interaction with the virtual equipment in response to the received user input; and
      adapting a sweet spot associated with the virtual equipment based on and in response to the determined user skill level, the sweet spot governing how the virtual equipment behaves in response to user interaction with the representation,
      where the sweet spot is an area of a distribution curve for a variable associated with the virtual equipment.

25. The system of claim 24, where: the sweet spot is related to one or more of: accuracy of the user interaction and precision of the user interaction.

26. The system of claim 24, where: the adapting includes changing an input model or the associated representation.

* * * * *